(12) United States Patent
Moore

(10) Patent No.: US 8,795,620 B2
(45) Date of Patent: *Aug. 5, 2014

(54) SYSTEMS AND METHODS FOR RECOVERING NITRIC ACID FROM PICKLING SOLUTIONS

(75) Inventor: James A. Moore, Beaver, PA (US)

(73) Assignee: ATI Properties, Inc., Albany, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,889

(22) Filed: Sep. 13, 2011

(65) Prior Publication Data

US 2012/0207664 A1    Aug. 16, 2012

Related U.S. Application Data

(63) Continuation-in-part of application No. 13/027,312, filed on Feb. 15, 2011.

(51) Int. Cl.
- *C01B 21/40* (2006.01)
- *C23G 1/02* (2006.01)
- *B01D 53/56* (2006.01)

(52) U.S. Cl.
CPC . *C01B 21/40* (2013.01); *C23G 1/02* (2013.01); *B01D 53/56* (2013.01)
USPC .......................................... 423/235; 423/393

(58) Field of Classification Search
CPC .... B01D 53/56; B01D 53/60; B01D 53/8625; B01D 53/8637; B01D 53/9409; B01D 53/40; B01D 53/402; B01D 53/404; C01B 21/40; C23G 1/02–1/088
USPC .............................................. 423/235, 239.1
See application file for complete search history.

(56) References Cited

U.S. PATENT DOCUMENTS

| 3,015,588 | A | * | 1/1962 | Hyams ............................ 134/36 |
| 3,652,227 | A |   | 3/1972 | Harman, III et al. |

(Continued)

FOREIGN PATENT DOCUMENTS

| EP | 0962247 | A2 |   | 12/1999 |            |
| EP | 1332786 | A2 |   | 8/2003  |            |
| GB | 1229107 |    | * | 4/1971  | ............. B01D 53/54 |
| GB | 1229107 | A  |   | 4/1971  |            |

OTHER PUBLICATIONS

Sulzer, "Gas-Gas mixing as applied to SCR's" 2003, NETL Conference, Slides 1-30.*

(Continued)

*Primary Examiner* — Stanley Silverman
*Assistant Examiner* — Justin Bova
(74) *Attorney, Agent, or Firm* — K & L Gates LLP; John E. Grosselin, III

(57) ABSTRACT

An embodiment of a method for recovering nitric acid from acid pickling solution includes introducing a treating material comprising at least one chemical into a pickling solution comprising free nitric acid. The treating material reacts with at least a portion of the free nitric acid in the pickling solution and produces $NO_x$. A gas stream comprising at least a portion of the $NO_x$ is contacted with ozone, thereby forming oxidation products including nitrogen sesquioxide and nitrogen pentoxide. At least a portion of the nitrogen sesquioxide and nitrogen pentoxide is contacted with water, thereby forming nitric acid, and at least a portion of the nitric acid is collected.

21 Claims, 4 Drawing Sheets

(56) References Cited

U.S. PATENT DOCUMENTS

| | | | |
|---|---|---|---|
| 3,673,245 A | 6/1972 | Mims | |
| 3,852,412 A | 12/1974 | Brenner | |
| 4,035,296 A | 7/1977 | Armstrong | |
| 4,138,470 A * | 2/1979 | Bolme | 423/394.2 |
| 4,142,874 A | 3/1979 | Vaseen | |
| 4,247,321 A | 1/1981 | Persinger | |
| 4,351,810 A * | 9/1982 | Martinez et al. | 423/235 |
| 4,352,740 A | 10/1982 | Grader et al. | |
| 4,565,675 A | 1/1986 | Uchino et al. | |
| 5,639,434 A | 6/1997 | Patrikainen et al. | |
| 5,985,223 A * | 11/1999 | Saxena et al. | 423/235 |
| 6,063,348 A | 5/2000 | Hinke et al. | |
| 6,162,409 A * | 12/2000 | Skelley et al. | 423/239.1 |
| 6,193,934 B1 | 2/2001 | Yang | |
| 6,322,756 B1 | 11/2001 | Arno et al. | |
| 6,649,132 B1 | 11/2003 | Hwang et al. | |
| 6,761,863 B2 | 7/2004 | Hwang et al. | |
| 7,632,475 B2 | 12/2009 | Suchak et al. | |
| 7,669,439 B2 | 3/2010 | Simpson et al. | |
| 7,766,995 B2 | 8/2010 | Suchak et al. | |
| 7,794,523 B2 | 9/2010 | Whitlock | |
| 2006/0076247 A1 * | 4/2006 | Giordani et al. | 205/705 |
| 2012/0207665 A1 | 8/2012 | Moore | |

OTHER PUBLICATIONS

Fox et al, "Steel Pickling: A Profile," Dec. 1993, US EPA, pp. 1-1 to 2-18.*

Higgins, "Industrial Processes to Reduce Generation of Hazardous Waste at DOD acilities", 1985, CHM Hill, 121 pages.

Sulzer Chemtech, "Gas-Gas Mixing as Applied to SCR's", Pittsburgh, Pennsylvania, Oct. 29-30, 2003, NETL Conference, Slides 1-30.

* cited by examiner

SYSTEMS AND METHODS FOR RECOVERING NITRIC ACID FROM PICKLING SOLUTIONS

CROSS-REFERENCE TO RELATED APPLICATIONS

The present application is a continuation-in-part application claiming priority under 35 U.S.C. §120 from co-pending U.S. patent application Ser. No. 13/027,312, filed on Feb. 15, 2011, and entitled "Treatment of $NO_x$-Containing Gas Streams", the entire disclosure of which is incorporated by reference herein.

TECHNICAL FIELD

The present disclosure is directed to systems and methods for recovering free nitric acid from an aqueous pickling solution including nitric acid.

BACKGROUND

Many manufacturing treatment and combustion processes produce gases that include gaseous nitrogen oxides ($NO_x$) and other undesirable gaseous products. For example, processes for acid pickling stainless steels and other alloys, which typically involve immersing the alloys for a time in a bath of a strongly acidic solution including nitric acid, result in gases above the bath that include $NO_x$. Federal and local environmental laws may limit the content of $NO_x$ that is discharged into the atmosphere. In the past decades, manufacturing companies have undertaken considerable efforts to reduce the amount of $NO_x$ discharged into the atmosphere.

One known method of removing $NO_x$ from a gas stream includes contacting the gas stream with ozone to thereby oxidize the $NO_x$ in the gas stream and form oxidation products such as nitrogen sesquioxide and nitrogen pentoxide. The oxidation products produced by the ozone treatment may be collected using aqueous scrubbers, for example, stored on-site, and discarded as a liquid waste stream. Discarding the liquid waste material may require third-party waste collection and disposal services.

It would be advantageous to provide an alternative method for removing $NO_x$ from the gases produced in an alloy pickling process or other manufacturing treatment or combustion process that results in a reduced amount of waste. More generally, it would be advantageous to provide a method for removing $NO_x$ from a gas stream produced in any process and that results in a reduced amount of waste.

SUMMARY

One aspect according to the present disclosure is directed to methods for treating a gas stream comprising $NO_x$. The methods include contacting a gas stream comprising $NO_x$ with ozone to thereby form oxidation products including nitrogen sesquioxide and nitrogen pentoxide. The methods further comprise reacting at least a portion of the nitrogen sesquioxide and nitrogen pentoxide with water to thereby form nitric acid, and recovering at least a portion of the nitric acid.

An additional aspect according to the present disclosure is directed to methods for treating a gas stream comprising $NO_x$, wherein the gas stream is produced in a process for pickling an alloy including contacting the alloy with an acidic solution comprising nitric acid. For example, the pickling process may comprise at least one of immersing the alloy in an acidic solution or spraying an acidic solution on the alloy. The methods comprise contacting the gas stream comprising $NO_x$ with ozone to thereby form oxidation products including nitrogen sesquioxide and nitrogen pentoxide. The methods further comprise reacting at least a portion of the nitrogen sesquioxide and nitrogen pentoxide with water to thereby form nitric acid, and recovering at least a portion of the nitric acid. In certain embodiments, at least a portion of the recovered nitric acid may be recycled back to the acidic solution used in the pickling treatment.

A further aspect according to the present disclosure is directed systems for treating a gas stream comprising $NO_x$. The systems comprise a first chamber and a second chamber. The first chamber includes a first inlet communicating with a source of a gas comprising $NO_x$, and a second inlet communicating with a source of ozone. The first chamber also includes an interior volume adapted to contact the gas comprising $NO_x$ gas with ozone, thereby producing intermediate products including nitrogen sesquioxide and nitrogen pentoxide. At least of portion of the nitrogen sesquioxide and nitrogen pentoxide react within the first chamber with water to form nitric acid. The second chamber receives gases from the first chamber. The second chamber includes a third inlet communicating with a source of water vapor and an interior volume adapted to contact gases from the first chamber with water vapor, thereby solubilizing nitric acid in the gases in the water vapor. The second chamber further includes an outlet for recovering at least a portion of the solubilized nitric acid.

In one particular embodiment of a system for treating a gas stream comprising $NO_x$ according to the present disclosure, the system is associated with an acid pickling apparatus for pickling an alloy. Gases including $NO_x$ produced by the acid pickling apparatus may be treated using the system so as to recover nitric acid. Optionally, at least a portion of the recovered nitric acid is recycled to the acid pickling apparatus.

An additional aspect according to the present disclosure is directed to a method for recovering nitric acid from acid pickling solution. The method includes introducing a treating material comprising at least one chemical into a pickling solution comprising free nitric acid. The treating material reacts with at least a portion of the free nitric acid in the pickling solution and produces $NO_x$. A gas stream comprising at least a portion of the $NO_x$ is contacted with ozone, thereby forming oxidation products including nitrogen sesquioxide and nitrogen pentoxide. At least a portion of the nitrogen sesquioxide and nitrogen pentoxide is contacted with water, thereby forming nitric acid, and at least a portion of the nitric acid is collected.

Yet another aspect according to the present disclosure is directed to a system for treating a gas stream comprising $NO_x$, wherein the system includes a pickling apparatus, a first chamber, and a second chamber. The pickling apparatus is selected from a pickling bath, a pickling tank, and a pickling spray device. The pickling apparatus including an acid pickling solution and comprises: an inlet adapted for introducing a treating material into contact with the acid pickling solution, wherein the treating material reacts with nitric acid to form $NO_x$; and a headspace in which gas comprising $NO_x$ collects. The first chamber includes: an interior volume; a first inlet communicating with the headspace of the pickling apparatus and adapted to convey at least a portion of the gas comprising $NO_x$ from the headspace to the interior volume; and a second inlet communicating with a source of ozone. The interior volume of the second chamber is adapted to contact the gas comprising $NO_x$ with the ozone, thereby producing oxidation products including nitrogen sesquioxide and nitrogen pentoxide, wherein at least a portion of the nitrogen sesquioxide and nitrogen pentoxide reacts with water in the first chamber to form nitric acid. The second chamber directly fluidly communicates with the first chamber and receives gaseous effluent from the first chamber. The second chamber includes: a third inlet communicating with a source of water vapor; an interior volume adapted to contact gases from the first chamber with the water vapor, thereby solubilizing nitric acid in the gaseous effluent from the first chamber with the water vapor; and an outlet for collecting solubilized nitric acid from the interior volume of the second chamber.

It is understood that the invention disclosed and described herein is not limited to the embodiments disclosed in this Summary.

BRIEF DESCRIPTION OF THE DRAWINGS

The characteristics of various non-limiting embodiments disclosed and described herein may be better understood by reference to the accompanying figures, in which.

Figure 1:
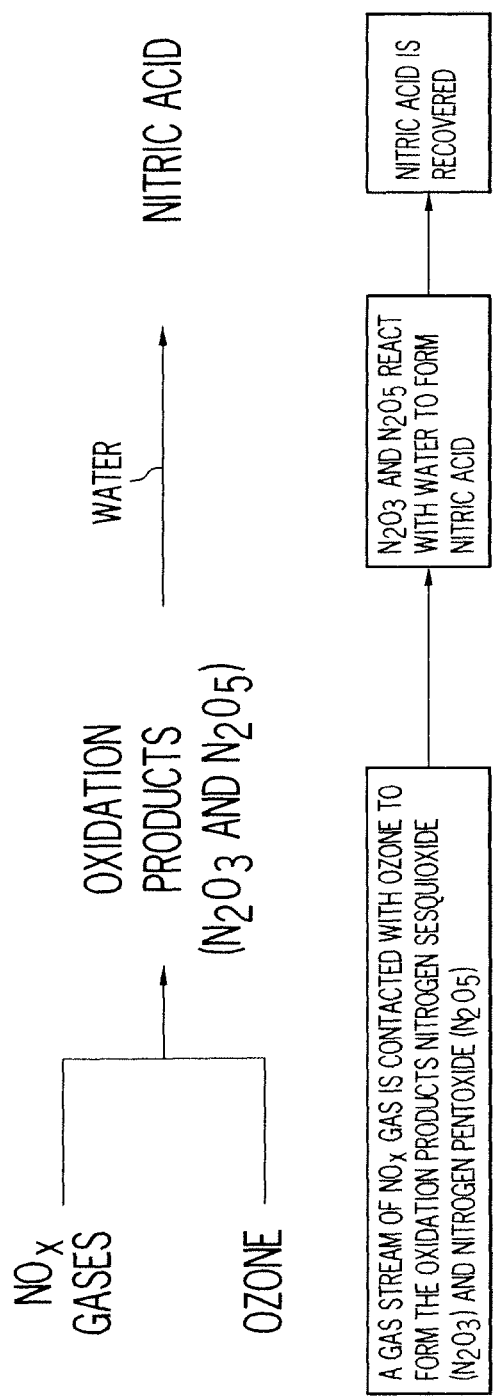
FIG. 1 is a flow diagram showing certain steps of a non-limiting embodiment of a method for treating a gas stream comprising $NO_x$ gas according to the present disclosure.

The reader will appreciate the foregoing details, as well as others, upon considering the following detailed description of certain non-limiting embodiments according to the present disclosure. The reader may also comprehend additional details upon implementing or using embodiments described herein.

DETAILED DESCRIPTION OF CERTAIN NON-LIMITING EMBODIMENTS

It is to be understood that the descriptions of the disclosed non-limiting embodiments herein may have been simplified to illustrate only those features and characteristics that are relevant to a clear understanding of the disclosed embodiments, while eliminating, for purposes of clarity, other features and characteristics. Persons having ordinary skill in the art, upon considering this description of the disclosed embodiments, will recognize that other features and characteristics may be desirable in a particular implementation or application of the disclosed embodiments. However, because such other features and characteristics may be readily ascertained and implemented by persons having ordinary skill in the art upon considering this description of the disclosed embodiments, and are, therefore, not necessary for a complete understanding of the disclosed embodiments, a description of such features, characteristics, and the like, is not provided herein. As such, it is to be understood that the description set forth herein is merely exemplary and illustrative of the disclosed embodiments and is not intended to limit the scope of the invention defined by the claims.

In the present disclosure, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant reserves the right to amend the present disclosure, including the claims, to expressly recite any sub-ranges subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage indicates otherwise.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this description. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicant reserves the right to amend the present disclosure to expressly recite any subject matter, or portion thereof, incorporated by reference herein.

The present disclosure includes descriptions of various embodiments. It is to be understood that the various embodiments described herein are exemplary, illustrative, and non-limiting. Thus, the present disclosure is not limited by the description of the embodiments. Rather, the invention is defined by the claims, which may be amended to recite any features or characteristics expressly or inherently described in or otherwise expressly or inherently supported by the present disclosure. Further, Applicant reserves the right to amend the claims to affirmatively disclaim features or characteristics that may be present in the prior art, but not necessarily expressly described herein. Therefore, any such amendments would comply with the requirements of 35

U.S.C. §112, first paragraph, and 35 U.S.C. §132(a). The various embodiments disclosed and described herein can comprise, consist of, or consist essentially of the features and characteristics as variously described herein.

Various embodiments disclosed herein are directed to methods of treating a gas stream comprising $NO_x$. Such embodiments include contacting a gas stream comprising $NO_x$ gas with ozone, thereby forming oxidation products including nitrogen sesquioxide and nitrogen pentoxide. At least a potion of the nitrogen sesquioxide and nitrogen pentoxide reaction products are reacted with water to form nitric acid, and at least a portion of the nitric acid is recovered and optionally may be applied in some useful purpose. Thus, in contrast to conventional methods for treating $NO_x$-containing gases, all or a portion of the oxidation products resulting from the reaction of the $NO_x$-containing gas with ozone are not directly removed as a waste stream using an aqueous scrubber. Instead, water is reacted with at least a portion of the nitrogen sesquioxide and nitrogen pentoxide oxidation products to form nitric acid, and at least a portion of the nitric acid is recovered and may be recycled or otherwise utilized. The nitric acid used in pickling of stainless steel and other alloys, for example, is expensive and recycling at least a portion of the acid may significantly reduce costs associated with pickling, as well as reduce the amount of waste fluids produced when the $NO_x$-containing gases generated by the pickling process are treated.

Embodiments of methods according to the present disclosure may be further understood by reference to the flow diagram of FIG. 1. In a first step, gaseous $NO_x$, which may be part of a gas stream, and ozone are reacted to produce oxidation products. The oxidation products may include nitrogen sesquioxide ($N_2O_3$) and nitrogen pentoxide ($N_2O_5$). In a second step, which may occur simultaneous with and/or removed in time from the first step, at least a portion of the nitrogen sesquioxide and nitrogen pentoxide react with water to form nitric acid ($HNO_3$). In a third step, at least a portion of the nitric acid is recovered.

Figure 2:
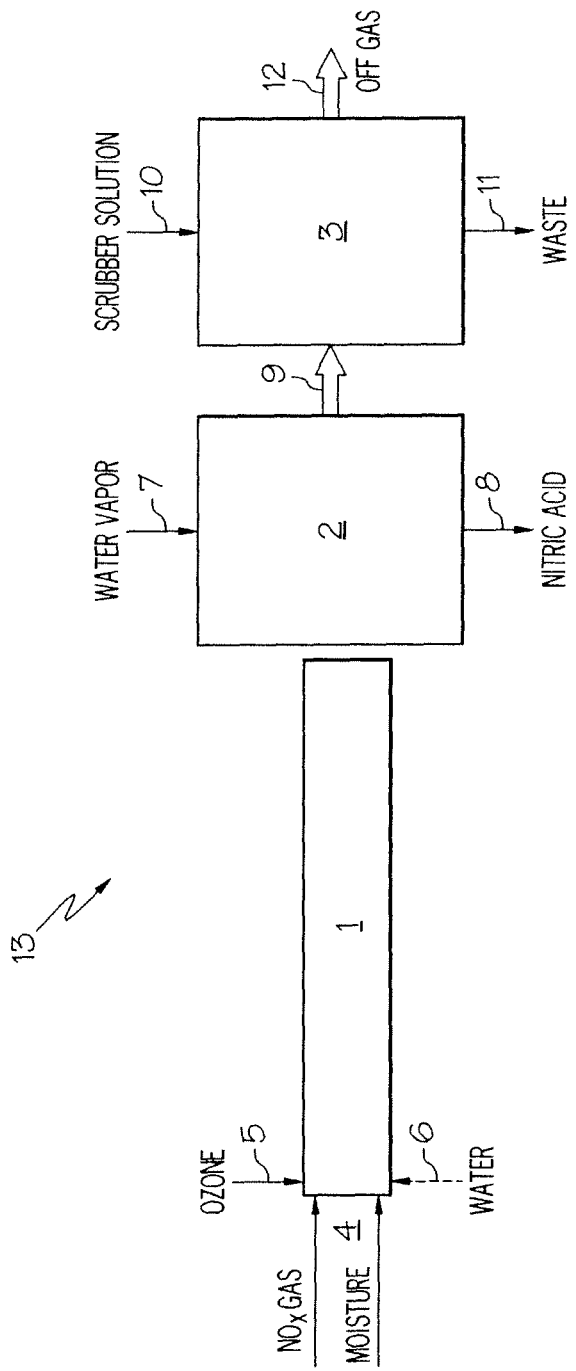
FIG. 2 is a schematic representation of a non-limiting embodiment of a system for treating a gas stream comprising $NO_x$ gas according to the present disclosure.

Various embodiments disclosed herein are directed to systems for treating a gas stream comprising $NO_x$ with ozone and producing and recovering nitric acid. One such embodiment is schematically depicted in FIG. 2, wherein system 13 includes a first chamber 1, a second chamber 2, and, optionally, a third chamber 3. The chambers 1,2,3 may be regions of an apparatus that communicate along a flow pathway. Alternatively, one or more of the chambers 1,2,3 may be separate structures that communicate along a flow pathway.

The first chamber 1 of system 13 receives an $NO_x$-containing gas stream and a gas stream including or consisting of ozone gas and is adapted to mix the streams together. First chamber 1 may include at least a first inlet 4 and a second inlet 5, and includes an interior volume. In certain non-limiting embodiments, the first chamber 1 may have a diameter of at least 24 inches. In certain non-limiting embodiments, the first chamber 1 may be at least 200 feet long. However, it will be understood that the first chamber 1 may have any dimensions and design suitable for mixing together the $NO_x$-containing gas stream and the stream including ozone and thereby facilitating reaction between the $NO_x$ and the ozone. In certain non-limiting embodiments, the temperature in the first chamber 1 may be less than 140° F. In certain non-limiting embodiments, the pressure in the first chamber 1 may be 10.5 water column (inches) vacuum. In certain non-limiting embodiments, the flow rate through the first chamber 1 of the $NO_x$-containing gas and the gas including ozone may be at least 500 cubic feet/min. It will be understood that the conditions within the first chamber 1 may be selected to facilitate reaction between the $NO_x$-containing gas stream and the stream including ozone and the further reaction of materials formed in the first chamber 1 to produce nitric acid. The flow rate within the first chamber 1 may be selected to permit adequate residence time in the first chamber 1. If residence time within the first chamber 1 is not adequate, the $NO_x$-containing gas stream and ozone may have difficulty mixing and reacting. In such case, oxidation products may not form in the first chamber 1, but instead might form in the second chamber 2 or third chamber 3. In certain non-limiting embodiments, the residence time in the first chamber 1 is at least 6 seconds.

The first inlet 4 communicates with a source of a gas including $NO_x$. The $NO_x$-containing gas stream preferably does not pass through a scrubber prior to passing through the first inlet 4 into the first chamber 1. Instead, the $NO_x$-containing gas stream preferably passes directly through the first inlet 4 from the source generating the $NO_x$-containing gas stream and is not "pre-treated". The $NO_x$-containing gas stream may be generated from any process that produces $NO_x$ gases. For example, in certain non-limiting embodiments, the NOx-containing gas stream is generated during an alloy manufacturing or treatment process or a combustion process. In certain non-limiting embodiments, $NO_x$-containing gas treated by a system according to the present disclosure is produced in a pickling process for treating metals and alloys. In one particular non-limiting embodiment, the $NO_x$-containing gas stream is generated in the headspace above an acid pickling tank or bath that may include, for example, nitric acid, and in which an alloy is immersed (i.e., "pickled") for a time to treat the alloy's surfaces. In certain other non-limiting embodiments, the $NO_x$-containing gas stream is generated by a spray pickling process in which a spray of an acid pickling solution is directed at surfaces of a metal or alloy. In certain non-limiting embodiments, the $NO_x$-containing gas stream generated by an acid pickling process may have a temperature in the range of ambient temperature to 140° F. As is known in the art, the acid solution used in an acid pickling tank, bath, or spray is a solution that includes one or more strong acids and which is used to remove surface impurities such as stains, inorganic contaminants, rust, and scale, from metals and metal alloys. In certain embodiments, the pickling tank, bath, or spray may be used to remove surface impurities from materials selected from titanium, titanium alloys, and stainless steels.

In certain non-limiting embodiments, the pickling bath may include one or more strong acids selected from the group consisting of hydrochloric acid, sulfuric acid, phosphoric acid, nitric acid, hydrofluoric acid, and combinations thereof. In certain specific non-limiting embodiments, the pickling bath may include one or both of nitric acid and hydrofluoric acid. Person having ordinary skill in the art may readily formulate a suitable pickling solution for a particular metal or alloy and, therefore, it is not necessary that the present description include a discussion of how to formulate or apply a pickling solution for a particular metal or alloy. It will be understood that embodiments of the method and system according to the present disclosure may be used with any pickling formulation that generates a $NO_x$-containing gas. More generally, it will be understood that certain embodiments of the method and system according to the present disclosure may be used to process $NO_x$-containing gas produced by any process, apparatus, system, or phenomenon.

In certain non-limiting embodiments of a method or system according to the present disclosure used in connection with a pickling process, the pickling solution within a pickling tank or bath or used in a pickling spray may have a temperature of at least 140° F. However, it will be understood that the pickling solution may have any temperature suitable for pickling a metal or alloy of interest. For example, in certain non-limiting embodiments, the pickling solution may have a temperature less than 140° F. In certain other non-limiting embodiments, the pickling solution may have a temperature equal to or higher than 140° F. In other non-limiting embodiments of a method or system according to the present disclosure used in connection with a pickling process, the pickling bath or tank may hold at least 5700 and as much as 15,000 gallons of pickling solution. However, it will be understood that the pickling bath or tank may hold any volume of pickling solution suitable for providing the desired surface processing of a metal or alloy mill product of interest. As previously noted, in certain other non-limiting embodiments of a pickling process that generates $NO_x$-containing gas, surface impurities such as stains, inorganic contaminants, rust, and scale, may be removed from metals and alloys using spray pickling. As used herein, spray pickling refers to a process of spraying an acid pickling solution on metal and/or metal alloy to remove surface impurities. Spray pickling may minimize or reduce the volume of acid that is used to treat the metal and/or metal alloy, but the process may still produce significant volumes of $NO_x$-containing gas.

Again referring to the system 13 schematically illustrated in FIG. 2, the first inlet 4 may further communicate with a source of moisture (water). In certain non-limiting embodiments of system 13, the moisture and the $NO_x$-containing gas stream enter the first chamber 1 at the same location, which may be, for example, inlet 4. In other non-limiting embodiments, the moisture and the $NO_x$-containing gas stream may enter the first chamber 1 at different locations. In yet other non-limiting embodiments, all or a portion of the moisture introduced into the first chamber 1 may be part of the $NO_x$-containing gas stream. For example, in embodiments of the method and system described herein associated with a pickling process or system, the $NO_x$-containing gas stream may be generated in the headspace of the acid pickling solution and, therefore, may include a certain moisture content as a result of evaporation of water from the acid pickling solution.

The second inlet 5 to chamber 1 of the system 13 communicates with a source of ozone. The ozone source may be, for example, an ozone generator or another known device that produces ozone (not shown), or an ozone storage device. In certain non-limiting embodiments, the ozone generating device may be located "on-site" so that ozone may be produced when needed to treat $NO_x$-containing gas generated by a pickling process or apparatus or another process or apparatus at the site. Because ozone has a short half-life, the ozone preferably is generated proximate the second inlet 5. For example, in certain non-limiting embodiments, an ozone generator device or other ozone source may be located near the second inlet 5. In other non-limiting embodiments, the ozone source may be located near the first inlet 4 and the second inlet 5. The ozone source may provide an ozone-containing gas stream including ozone in any concentration suitable to treat the particular $NO_x$-containing gas stream that is being introduced into the first chamber 1. In certain non-limiting embodiments, the concentration of ozone in the gas stream introduced into the first chamber 1 at second inlet 5 may be in the range of 1 to 16 percent by volume.

In certain non-limiting embodiments of system 13, the second inlet 5, at which a gas including ozone is introduced into the first chamber 1 may be located adjacent (i.e., near to) the first inlet 4 so that $NO_x$ entering the first chamber 1 at the first inlet 4 contacts ozone introduced at the second inlet 5 and suitably reacts to form oxidation products including nitrogen sesquioxide and nitrogen pentoxide. Those having ordinary skill may readily ascertain a suitable minimum, maximum, and/or range of distances between the first inlet 4 and the second inlet 5 so that the $NO_x$ in the $NO_x$-containing gas stream and the ozone in the ozone-containing gas stream react within the first chamber 1 to a degree that results in the particular desired minimum reduction in the concentration of $NO_x$ in the $NO_x$-containing gas stream entering the first chamber 1. The shape and size of the interior volume of the first chamber 1 may be adapted to promote contact between and thereby suitably react the $NO_x$-containing gas stream and the ozone to produce oxidation products including nitrogen sesquioxide and nitrogen pentoxide. These reaction products can be formed in the first chamber 1 by reaction of nitrogen oxides ($NO_x$, including NO and $NO_2$) and ozone ($O_3$) according to the following equations:

$$NO + O_3 \rightarrow NO_2 + O_2 \quad \quad \text{A.)}$$

$$NO_2 + O_3 \rightarrow NO_3 + O_2$$

$$NO_3 + NO_2 \leftrightarrows N_2O_5$$

$$NO + NO_2 \leftrightarrows N_2O_3 \quad \quad \text{B.)}$$

The degree to which the $NO_x$ in the $NO_x$-containing gas stream reacts with the ozone in the first chamber 1 to form oxidation products including nitrogen sesquioxide and nitrogen pentoxide depends on many factors including, but not limited to, the flow rates of the gases, residence time, the concentration on $NO_x$ and ozone in the respective gas streams, the temperatures of the reactants, and the particular mixing action that occurs between the gas streams within the first chamber 1. Those having ordinary skill may suitably adjust or influence one or more of these parameters to adjust the reaction rate occurring in the first chamber 1 and achieve the desired level of conversion of $NO_x$ in the $NO_x$-containing gas stream.

In certain non-limiting embodiments of the system 13, the $NO_x$-containing gas stream is not treated in a scrubber prior to being introduced into the interior volume of the first chamber 1 and contacting ozone therein. Also, in certain non-limiting embodiments of a system according to the present disclosure, the $NO_x$-containing gas stream may be mixed with the ozone-containing gas stream in the first chamber 1 using a device adapted to mix gas streams. For example, the $NO_x$-containing gas stream may be mixed with ozone-containing gas stream using a static mixer. As used herein, the term "static mixer" refers to a device that includes a series of fixed elements with a specific geometric design so as to promote patterns of flow division and radial mixing. A static mixer may be used to promote mixing of at least two liquids or at least two gases, to disperse a gas into a liquid, or to disperse at least two immiscible liquids. Although it is believed that a static mixer is not required in the system 13, providing a static mixer may improve system efficiency and reduce the length of the first chamber 1 necessary to allow the gas streams introduced into the first chamber 1 to mix and suitably react. In certain non-limiting embodiments of the system 13, for example, a static mixer may be located in or associated with the first chamber 1 near the first inlet 4 and the second inlet 5. In certain non-limiting embodiments of system 13, a static mixer may be located immediately following the second inlet 5.

At least a portion of the nitrogen sesquioxide and nitrogen pentoxide oxidation products formed in the first chamber 1 further react with water in the interior volume of the first chamber 1 to form nitric acid. As discussed above, water introduced into the interior volume of the first chamber 1 may be, for example, moisture that is already a component of the $NO_x$-containing gas stream introduced into the first chamber 1 at first inlet 4 and/or water introduced into the first chamber 1 from one or more inlets into the first chamber 1 that communicate with one or more water sources. A possible water source 6 is indicated in FIG. 2. It will be understood that the system 13 may be constructed in any suitable way so that a sufficient concentration of water is present in the first chamber 1 to suitably react with oxidation products in the first chamber and form nitric acid. In certain non-limiting embodiments, the first inlet 4 may be located near the water source 6. In certain other non-limiting embodiments, the first inlet 4 and second inlet 5 may be located near the water source 6. It will be understood that the particular design of the system 13 and the first chamber 1 will influence the optimal positioning of the one or more water inlets into the first chamber 1, if such is provided, so as to optimally facilitate reaction of water and oxidation products in the first chamber 1.

Again referring to FIG. 2, the second chamber 2 of system 13 may be located downstream (i.e., in the direction of gas flow) from the first chamber 1. The first and second chambers 1,2 preferably are directly fluidly connected so that the effluent from the first chamber 1 flows to the second chamber 2. The second chamber is adapted to recover nitric acid from the effluent emerging into the second chamber 2 from the first chamber 1. In certain embodiments of the system 13, the second chamber 2 may be a mist eliminator which, as is known to those having ordinary skill, is a device including a large cross-sectional surface area adapted for condensation of liquid from a mist introduced (e.g., injected) into the mist eliminator. A mist eliminator preferably removes mist as a liquid from a gas stream by reducing the velocity of gas as it passes through the mist eliminator, thereby trapping the mist so that it may be removed as a liquid via gravity.

As illustrated in FIG. 2, in certain non-limiting embodiments, the second chamber 2 of system 13 may include a third inlet 7, an interior volume, and an outlet 8 through which solubilized nitric acid is collected or recovered from the interior volume. The third inlet 7 communicates with a source of water vapor which, in certain non-limiting embodiments, is sprayed into the interior volume of the second chamber 2. The interior volume is adapted to contact gaseous effluent from the first chamber 1 with water vapor to thereby solubilize in the water vapor nitric acid in the gaseous effluent from the first chamber 1. The solubilized nitric acid is then collected as an aqueous nitric acid solution and is extracted from the bottom of the second chamber 2 through outlet 8. The concentration of the nitric acid may be adjusted by, for example, controlling the volume of water that is introduced into the system 13 over time. For example, introducing water into the system 13 at a relatively high rate, as a component of the $NO_x$-containing gas stream and/or through one or more water inlets associated with the first chamber 1, may dilute the nitric acid formed in and recovered from the system 13. Alternatively, introducing a lesser volume of water in the system 13 over time may concentrate the nitric acid formed in and recovered from the system 13.

In certain embodiments, the recovered nitric acid is recycled back to the process or apparatus that initially generated the $NO_x$-containing gas that is treated by the system 13. For example, in the embodiment in which the system 13 is associated with a pickling tank, bath, or spray that produces an $NO_x$-containing gas stream treated in the system 13, the nitric acid recovered from the second chamber 2 may be piped or otherwise transferred back to the pickling tank, bath, or spray and used to pickle additional metal or alloy mill products. Alternatively, the nitric acid recovered from the second chamber 2 may be stored, sold, or properly disposed of, for example.

Again referring to FIG. 2, system 13 optionally includes a third chamber 3 that is located downstream from the second chamber 2 and receives the gaseous effluent from chamber 2. In certain non-limiting embodiments, the third chamber 3 may be a scrubber. A scrubber is a device or system that extracts pollutants or other materials from a gas stream. As is known in the art, a scrubber may be a wet scrubber, which uses a liquid to remove materials from a gas stream, or a dry scrubber, which uses a dry material to remove materials from a gas stream. For example, the gaseous effluent from chamber 2 may include un-reacted nitrogen oxides, nitric acid that has not been captured by the second chamber 2, nitric acid produced in regions of the system 13 beyond the second chamber 2, mercury, sulfur oxides, and/or entrained particulates that one wishes to remove from the gas stream exiting the second chamber 2, and such materials may be fully or partially removed using a scrubber in the third chamber 3. For example, nitrogen oxides that are not converted to oxidation products in the first chamber 1 may pass un-reacted through the second chamber 2 and enter the third chamber 3. Such un-reacted nitrogen oxides may be partially or fully removed from the gas stream in chamber 3. Also, for example, nitric acid that is not recovered in the second chamber 2 may enter the third chamber 3 through conduit 9 and be partially or wholly collected in the third chamber 3.

In certain non-limiting embodiments, the third chamber 3 may include a fourth inlet 10, a terminal outlet 12 for releasing a gas to the environment, and a second outlet 11 for collecting waste from the interior volume of the third chamber 3. In embodiments in which the third chamber 3 is a wet scrubber device, the fourth inlet 10 may communicate with a source of a scrubber solution. The scrubber solution may be, for example, a non-caustic solution, such as water, or a caustic solution, such as a water/sodium hydroxide solution. In certain non-limiting embodiments, the particular scrubber solution may be recirculated through the scrubber to neutralize non-recovered nitric acid passing into the third chamber 3. The first outlet 12 releases any nitrogen oxides ($NO_x$) that are not removed in the second chamber 2 or third chamber 3. The second outlet 11 may be used for extracting wastes from the third chamber 3, and the waste may be reused and/or disposed of, as the case may be.

A $NO_x$-containing gas stream treatment system constructed as generally described in the present disclosure can produce a significant volume of nitric acid in a 24 hour period. For example, it is believed that an apparatus constructed as generally shown in FIG. 2 could potentially recover as much as 1350 pounds/day of nitric acid (based on 100% acid) from a waste gas stream including 1200 ppm $NO_x$ and flowing at a rate of 4,500 scfm (standard cubic feet per minute). Tests conducted on a prototype system constructed as generally discussed according to the present disclosure and having the general design shown in FIG. 2 successfully produced a significant volume of 42% (volume/volume) nitric acid from a $NO_x$-containing gas stream produced by an alloy pickling apparatus.

An additional aspect of the present disclosure is directed to a method for recovering nitric acid from an acid pickling solution such as, for example, a used or waste ("spent") acid pickling solution. A non-limiting embodiment of the method comprises treating a gas stream comprising $NO_x$ wherein at least a portion of the $NO_x$ in the gas stream is generated by treating a used or spent acid pickling solution. During finishing of stainless steel, for example, annealing and other finishing processes are carried out in the presence of air, and a thin oxide film forms on the surface of the stainless steel. In addition, a zone that is depleted of chromium normally forms under the oxide film when the steel is treated at high temperatures. The pickling process is used to clean and condition the steel's surfaces. Removal of the thermally grown oxide scale typically is accomplished using shot blasting or electrolyte pickling in a neutral salt. The chromium-depleted zone is removed by pickling in an acid solution, which typically includes two or more acids. Some amount of the bulk steel also may be removed during acid pickling to provide the steel with a bright surface. The mixed acid solution in the pickling bath, also referred to as pickling solution or "pickling liquor", commonly is an aqueous solution including 90-160 g/L nitric acid and 10-40 g/L hydrofluoric acid, but may include other acids instead of or in addition to hydrofluoric acid. The nitric acid is a strong oxidizing agent and oxidizes the metals and metal oxides, forming, for example, $Cr^{3+}$, $Ni^{2+}$, and $Fe^{3+}$ ions in the pickling solution. The hydrofluoric acid in the pickling solution forms stable complexes with the metal ions. The rate of pickling at a given time depends on the temperature of the pickling bath, the concentration of free (i.e., unreacted) acid in the pickling solution, and the concentration of dissolved chromium and iron in the pickling solution. In order to maintain a satisfactory pickling rate, a minimum concentration of free nitric acid and hydrofluoric acid must be maintained in the pickling solution.

Concentrated nitric acid and hydrofluoric acid can be added to a pickling bath to maintain a sufficient free acid concentration in the pickling solution. However, as the pickling process proceeds, the metals content of the pickling solution increases. Unless the metals content is reduced, it can reach a point at which metal salts begin to crystallize out of solution and form a strongly adhering sludge, necessitating that the pickling tank or bath be drained and cleaned. Therefore, the composition of the pickling solution must be adjusted over time to maintain a sufficient concentration of free acid and avoid conditions resulting in crystallization of metal salts. Spent pickling solution includes significant concentrations of nitrate, fluoride, and heavy metals, but also includes concentrations of free (unreacted) nitric acid and free hydrofluoric acid. The free nitric acid lost in spent pickling solution would be valuable if it could be recovered and, for example, re-used in the pickling process or in other applications. Techniques have been developed to treat spent pickling solution to recover free nitric acid and free hydrofluoric acid. In certain known pickling solution regeneration systems, for example, spent pickling solution is passed through an ion exchange resin bed to separate free acid from metal values. The free acid may then be re-used in the pickling process or in other applications. Nitric acid, however, is a strong oxidizing agent and, therefore, has a tendency to oxidize ion exchange resins. In such systems, therefore, the temperature and acid concentration of the pickling solution must be closely monitored and controlled to protect the resin bed from damage. If the temperature of the nitric acid is too high, or if the acid is too concentrated, it will aggressively attack the resin bed. Thus, pickling solution regeneration systems typically include heat exchanger units to cool the solution prior to contacting the resin bed. Also, suspended solids must be removed from the spent pickling solution to prevent the solids from physically clogging the resin bed. As such, pickling solution regeneration systems typically also include media filters and other types of filter units to isolate particulate material from the solution before it contacts the resin bed. Given the complexity of ion exchange resin-based pickling solution regeneration systems, the systems tend to be costly and require significant investment in terms of oversight and maintenance by plant personnel.

The present inventor has developed a unique method for recovering free nitric acid from pickling solution such as, for example, a used or spent pickling solution. Rather than treat used or spent pickling solution in an ion exchange regeneration system, the used or spent pickling solution is chemically treated to generate $NO_x$ from all or a portion of free nitric acid in the solution. All or a portion of the $NO_x$ enters headspace above the pickling bath, tank, or other pickling device and the $NO_x$-containing gas in the headspace may then be treated using the method according to the present disclosure that is described above, in which a gas stream comprising $NO_x$ is processed to produce solubilized nitric acid. Therefore, according to one aspect of the present disclosure, $NO_x$ gas is intentionally generated by introducing a treating material into used or spent acid pickling solution including free nitric acid. The acid pickling solution may be in an acid pickling bath or tank, or may have been used in a pickling spray device, for example. All or a portion of the $NO_x$ generated by introducing the treating material into the pickling solution enters headspace above the bath or tank or associated with the spray device, and the resulting $NO_x$-containing gas stream is treated by the following method: contacting the gas stream comprising $NO_x$ with ozone, thereby forming oxidation products including nitrogen sesquioxide and nitrogen pentoxide; reacting at least a portion of the nitrogen sesquioxide and nitrogen pentoxide with water, thereby forming nitric acid; and collecting at least a portion of the nitric acid. Instead of introducing the treating materials into a bath, tank, or spray device, for example, used or spent pickling solution may be drained or piped from the pickling bath, tank, or spray device to another tank or compartment where it is contacted with treating material to generate $NO_x$ from the free nitric acid in the solution, and then a gas stream including all or a portion of the generated $NO_x$ is treated by the method according to the present disclosure described above to thereby generate nitric acid.

The pickling solution may be chemically treated in any suitable way to generate $NO_x$ from all or a portion of the liquor that is being treated. For example, the treating material may include one or more chemicals that react with the free nitric acid to form $NO_x$, and the treating material may be mixed with or introduced into the pickling solution being treated. Chemicals that react with free nitric acid to form $NO_x$ include, for example, ferrous sulfate, and other reducing agents such as, for example, metals and alloys such as carbon steel and iron. In particular, ferrous sulfate is a byproduct produced during sulfuric acid pickling. Those having ordinary skill may identify other reducing chemicals that may be used to convert free nitric acid to $NO_x$.

If, for example, used or spent pickling solution is being treated by placing treating materials directly into a pickling bath or tank holding the pickling solution, the treating material may be introduced by a pipe or other inlet into the bath or tank in a single batch or in a periodic or continuous fashion to react with the free nitric acid in the pickling solution. The process of reacting the treating material with the free nitric acid in the pickling solution may be facilitated by, for example, mixing or agitating the bath or tank to improve the reaction. In an alternative embodiment, wherein all or a portion of the pickling liquor in a pickling tank or bath is drained or piped from the pickling bath or tank to a secondary tank or compartment to be treated, the treating material may be introduced by a pipe or by other means in a batch, periodic, or continuous fashion into the secondary tank or compartment to react with free nitric acid in the pickling solution. In yet another embodiment, used or spent pickling solution may be removed from a pickling tank, bath, spray device, or other pickling device and piped or transported to another location for treatment with the treating material to generate $NO_x$ from free nitric acid in the pickling solution, and then the $NO_x$-containing gas may be treated according to the present disclosure to recover solubilized nitric acid.

Figure 3:
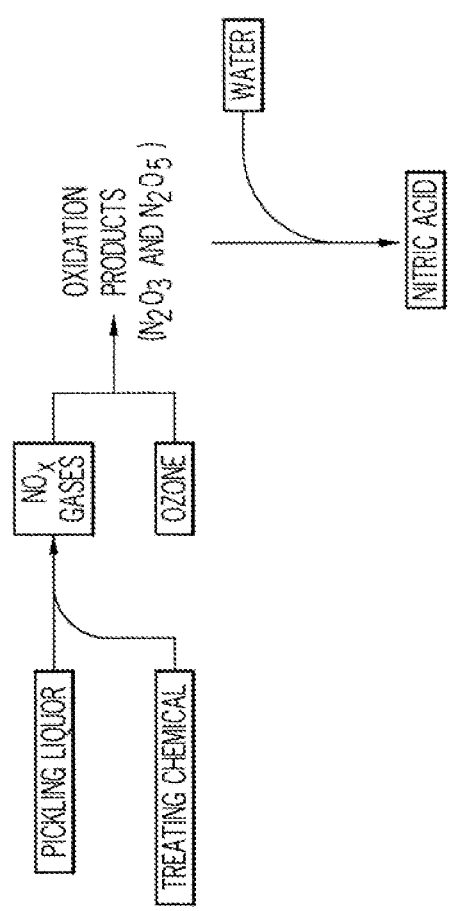
FIG. 3 is a schematic diagram of an embodiment of a method according to the present disclosure in which used or spent pickling solution is mixed with a treating material that will react with free nitric acid in the pickling solution to produce $NO_x$.

In one non-limiting embodiment according to the present disclosure, schematically shown in FIG. 3, used or spent pickling solution is mixed with a treating material that will react with free nitric acid in the pickling solution to produce $NO_x$. In certain non-limiting embodiments, the pickling solution continuously flows from a pickling tank, bath, or spray device, for example, through a pipe or other conduit, into a secondary tank or compartment, where it is reacted, either in a batch operation or continuously, with the treating material. A gas stream consisting of or including all or a portion of the $NO_x$ formed by reaction of the pickling solution and the treating material is reacted with ozone to produce oxidation products that include nitrogen sesquioxide ($N_2O_3$) and nitrogen pentoxide ($N_2O_5$). In a step that may occur simultaneous with and/or removed in time from the step of reacting the $NO_x$ with the ozone, at least a portion of the nitrogen sesquioxide and nitrogen pentoxide reacts with water to form nitric acid, and at least a portion of the nitric acid is recovered.

Figure 4:
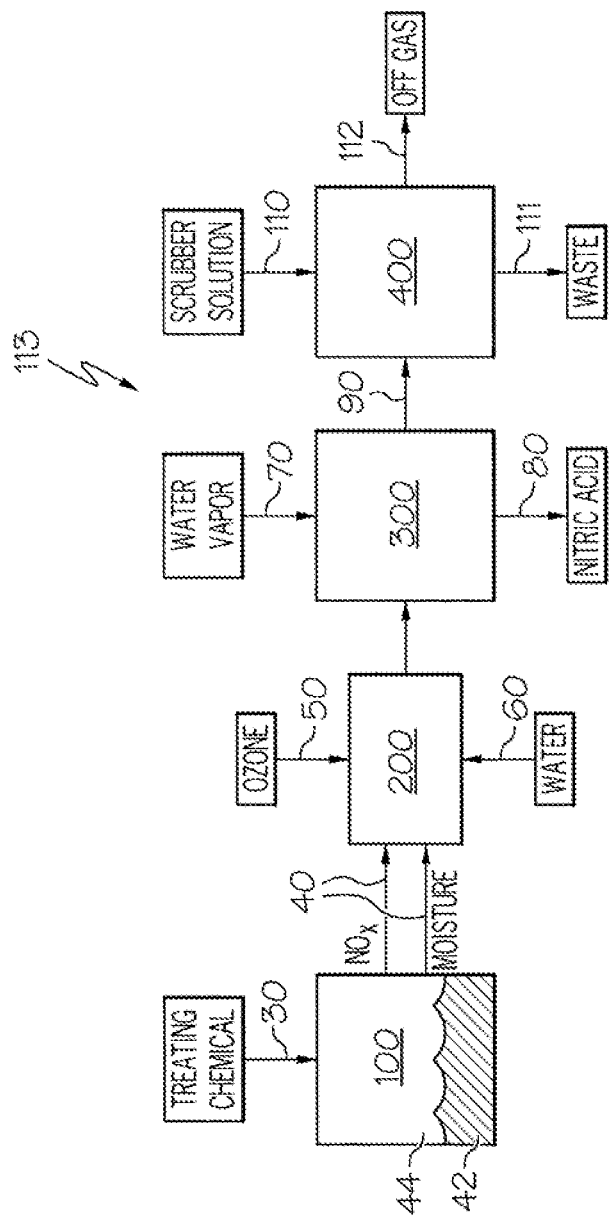
FIG. 4 is a schematic diagram of an embodiment of a system according to the present disclosure for treating a gas stream comprising $NO_x$ with ozone and producing and recovering nitric acid.

Certain non-limiting embodiments according to the present disclosure are directed to systems for treating a gas stream comprising $NO_x$ with ozone and producing and recovering nitric acid, wherein at least part of the $NO_x$-containing gas stream is $NO_x$ generated by treating used or spent acid pickling solution with one or more chemicals to generate $NO_x$ from free nitric acid in the pickling solution. One such embodiment is schematically depicted in FIG. 4, wherein system 113 includes a pickling tank 100, a first chamber 200, a second chamber 300, and, optionally, a third chamber 400. Pickling tank 100 communicates with first chamber 200 so that gases from pickling tank 100 may be introduced into first chamber 200. The chambers 200,300,400 may be regions of an apparatus that communicate along a flow pathway. Alternatively, one or more of the chambers 200,300,400 may be separate structures that communicate along a flow pathway.

Pickling tank 100 includes acid pickling solution 42 comprising an amount of free nitric acid. The pickling tank may be of a conventional design, including a shroud or other suitable structure to capture gases generated by the pickling process. A treating material that reacts with free nitric acid in the pickling solution to produce $NO_x$ is introduced into the pickling solution through an inlet 30 in a wall of the pickling tank 100. The treating material may be introduced in a batch, periodically, or continuously, as appropriate, to generate $NO_x$ from free nitric acid in the pickling solution 42 in the pickling tank 100. All or a portion of $NO_x$ produced by the chemical reaction enters the gases in the headspace 44 above the pickling solution 42 in the pickling tank 100. Although system 113 includes a pickling tank 100, it will be understood that system 113 may be adapted to include a different pickling apparatus, such as a pickling apparatus including a picking bath or a pickling spray device. Also, although system 113 is adapted so that treating material is introduced into the pickling tank 100, it will be understood that the system 113 may be modified so that pickling solution is contacted with treating material in a separate secondary tank or compartment associated with the pickling tank.

The first chamber 200 of system 113 receives a $NO_x$-containing gas stream and a gas stream including or consisting of ozone gas and is adapted to mix the streams together. In system 113, the $NO_x$-containing gas is fed from the headspace 44 of the pickling tank 100. However, it will be understood that if, for example, pickling solution and treating material are contacted in a secondary tank or compartment, then the $NO_x$-containing gas may be partially or wholly fed from the secondary tank or compartment in which the reaction occurs. First chamber 200 may include at least a first inlet 40 and a second inlet 50, and includes an interior volume. In certain non-limiting embodiments, the first chamber 200 may have a diameter of at least 24 inches. In certain non-limiting embodiments, the first chamber 200 may be at least 200 feet long. However, it will be understood that the first chamber 200 may have any dimensions and design suitable for mixing together the $NO_x$-containing gas stream and the stream including ozone and thereby facilitating reaction between the $NO_x$ and the ozone. For example, the first chamber 200 may have a design and be operated as described in connection with system 13 illustrated in FIG. 2. Accordingly, in certain non-limiting embodiments, the temperature within in the first chamber 200 may be less than 140° F. In certain non-limiting embodiments, the pressure in the first chamber 200 may be 10.5 water column (inches) vacuum. In certain non-limiting embodiments, the flow rate through the first chamber 200 of the $NO_x$-containing gas and the gas including ozone may be at least 500 cubic feet/min. It will be understood that the conditions within the first chamber 200 may be selected to facilitate reaction between the $NO_x$-containing gas stream and the stream including ozone and the further reaction of materials formed in the first chamber 200 to produce nitric acid. The flow rate within the first chamber 200 may be selected to permit adequate residence time in the first chamber 200. If residence time within the first chamber 200 is not adequate, the $NO_x$-containing gas stream and ozone may have difficulty mixing and reacting. In such case, oxidation products may not form in the first chamber 200, but instead might form in the second chamber 300 or third chamber 400 of system 113. In certain non-limiting embodiments, the residence time in the first chamber 200 is at least 6 seconds.

The $NO_x$-containing gas stream preferably does not pass from the headspace 44 of the pickling tank 100 through a scrubber prior to passing through the first inlet 40 into the first chamber 200. Instead, the $NO_x$-containing gas stream preferably passes directly through the first inlet 40 from pickling tank 100 and is not "pre-treated". Although system 113 includes acid pickling tank 100, it will be apparent that a different type of pickling apparatus may generate the $NO_x$-containing gas stream. For example, the $NO_x$-containing gas stream may be generated by a spray pickling apparatus in which a spray of an acid pickling solution is directed at surfaces of a metal or alloy. In certain embodiments, the pickling tank, bath, or spray may be used to remove surface impurities from materials selected from titanium, titanium alloys, and stainless steels.

In certain non-limiting embodiments system 113, the pickling solution (liquor) within pickling tank 100 has a temperature of at least 140° F. However, it will be understood that the pickling solution may have any temperature suitable for pickling a metal or alloy of interest. For example, in certain non-limiting embodiments, the pickling solution may have a temperature less than 140° F. In certain non-limiting embodiments of system 113, the pickling tank 100 holds at least 5700 and as much as 15,000 gallons of pickling solution. However, it will be understood that the pickling tank 100 may hold any volume of pickling solution suitable for providing the desired surface processing of a metal or alloy of interest.

Again referring to the system 113 schematically illustrated in FIG. 4, the first inlet 40 may further communicate with a source of moisture (water). In certain non-limiting embodiments of system 113, the moisture and the $NO_x$-containing gas stream enter the first chamber 200 at the same location, which may be, for example, inlet 40. In other non-limiting embodiments of system 113, the moisture and the $NO_x$-containing gas stream may enter the first chamber 200 at different locations. In yet other non-limiting embodiments, all or a portion of the moisture introduced into the first chamber 200 may be part of the $NO_x$-containing gas stream, generated as a result of evaporation of water from the pickling solution 42.

Second inlet 50 to chamber 200 of the system 113 communicates with a source of ozone. The ozone source may be, for example, an ozone generator or another known device that produces ozone (not shown), or an ozone storage device. In certain non-limiting embodiments, the ozone generating device may be located "on-site" so that ozone may be produced when needed to treat $NO_x$-containing gas generated by a pickling process. Because ozone has a short half-life, the ozone preferably is generated proximate the second inlet 50. For example, in certain non-limiting embodiments, an ozone generator device or other ozone source may be located near the second inlet 50. In other non-limiting embodiments, the ozone source may be located near the first inlet 40 and the second inlet 50. The ozone source may provide an ozone-containing gas stream including ozone in any concentration suitable to treat the $NO_x$-containing gas stream that is being introduced into the first chamber 200 from the pickling tank 100. In certain non-limiting embodiments, the concentration of ozone in the gas stream introduced into the first chamber 200 at second inlet 50 may be in the range of 1 to 16 percent by volume.

In certain non-limiting embodiments of system 113, the second inlet 50, at which a gas including ozone is introduced into the first chamber 200 may be located adjacent (i.e., near to) the first inlet 40 so that $NO_x$ entering the first chamber 200 from the pickling tank 100 at the first inlet 40 contacts ozone introduced at the second inlet 50 and suitably reacts to form oxidation products including nitrogen sesquioxide and nitrogen pentoxide. Those having ordinary skill may readily ascertain a suitable minimum, maximum, and/or range of distances between the first inlet 40 and the second inlet 50 so that the $NO_x$ in the $NO_x$-containing gas stream and the ozone in the ozone-containing gas stream react within the first chamber 200 to a suitable degree. As discussed above in connection with the description of system 13, the degree to which the $NO_x$ in the $NO_x$-containing gas stream reacts with the ozone in the first chamber 200 to form oxidation products including nitrogen sesquioxide and nitrogen pentoxide depends on many factors including, but not limited to, the flow rates of the gases, residence time, the concentration on $NO_x$ and ozone in the respective gas streams, the temperatures of the reactants, and the particular mixing action that occurs between the gas streams within the first chamber 200. Those having ordinary skill may suitably adjust or influence one or more of these parameters to adjust the reaction rate occurring in the first chamber 200 and achieve the desired level of conversion of $NO_x$ in the $NO_x$-containing gas stream.

In certain non-limiting embodiments of the system 113, the $NO_x$-containing gas stream is not treated in a scrubber prior to being introduced into the interior volume of the first chamber 200 and contacting ozone therein. Also, in certain embodiments of system 113, the $NO_x$-containing gas stream is mixed with the ozone-containing gas stream in the first chamber 200 using a device adapted to mix gas streams. For example, the $NO_x$-containing gas stream may be mixed with ozone-containing gas stream using a static mixer. Although it is believed that a static mixer is not required in the system 113, providing a static mixer may improve system efficiency and reduce the length of the first chamber 200 necessary to allow the gas streams introduced into the first chamber 200 to mix and suitably react. In certain non-limiting embodiments of the system 113, for example, a static mixer may be located in or associated with the first chamber 200 near the first inlet 40 and the second inlet 50. In certain non-limiting embodiments of system 113, a static mixer may be located immediately following the second inlet 50.

At least a portion of the nitrogen sesquioxide and nitrogen pentoxide oxidation products formed in the first chamber 200 further react with water in the interior volume of the first chamber 200 to form nitric acid. As discussed above, all or a portion of water introduced into the interior volume of the first chamber 200 at first inlet 40 may be, for example, moisture that is already a component of the $NO_x$-containing gas stream from the pickling tank 100 and/or water introduced into the first chamber 200 from one or more inlets into the first chamber 200 that communicate with one or more water sources. A possible water source 60 is indicated in FIG. 4. It will be understood that the system 113 may be constructed in any suitable way so that a sufficient concentration of water is present in the first chamber 200 to suitably react with oxidation products in the first chamber 200 and form nitric acid. In certain non-limiting embodiments, the first inlet 40 may be located near the water source 60. In certain other non-limiting embodiments, the first inlet 40 and second inlet 50 may be located near the water source 60. It will be understood that the particular design of the system 113 and the first chamber 200 will influence the optimal positioning of the one or more water inlets into the first chamber 200, if such is provided, so as to optimally facilitate reaction of water and oxidation products in the first chamber 200.

Again referring to FIG. 4, the second chamber 300 of system 113 may be located downstream (i.e., in the direction of gas flow) from the first chamber 200. The first and second chambers 200,300 preferably are directly fluidly connected so that effluent from the first chamber 200 flows to the second chamber 300. The second chamber 300 is adapted to recover nitric acid from the effluent emerging into the second chamber 300 from the first chamber 200. In certain embodiments of the system 113, the second chamber 300 may be a mist eliminator which As illustrated in FIG. 4, in certain non-limiting embodiments, the second chamber 300 of system 113 may include a third inlet 70, an interior volume, and an outlet 80 through which solubilized nitric acid is collected or recovered from the interior volume of the second chamber 300. The third inlet 70 communicates with a source of water vapor which, in certain non-limiting embodiments, is sprayed into the interior volume of the second chamber 300. The interior volume of the second chamber 300 is adapted to contact gaseous effluent from the first chamber 200 with water vapor to thereby solubilize in the water vapor nitric acid in the gaseous effluent from the first chamber 200. The solubilized nitric acid is then collected as an aqueous nitric acid solution and is extracted from the bottom of the second chamber 300 through outlet 80. The concentration of the nitric acid may be adjusted by, for example, controlling the volume of water that is introduced into the system 113 over time. For example, introducing water into the system 113 at a relatively high rate, as a component of the $NO_x$-containing gas stream and/or through one or more water inlets associated with the first chamber 200, may dilute the nitric acid formed in and recovered from the system 113. Alternatively, introducing a lesser volume of water in the system 113 over time may concentrate the nitric acid formed in and recovered from the system 113.

In certain embodiments, the recovered nitric acid is recycled back to the pickling tank 100. In such case, for example, all or a portion of the nitric acid recovered from the second chamber 300 may be piped or otherwise transferred back to the pickling tank 100 and used to pickle additional metal or alloy. Alternatively, the nitric acid recovered from the second chamber 300 may be stored, sold, or properly disposed of, for example. Again referring to FIG. 4, system 113 optionally includes a third chamber 400 that is located downstream from the second chamber 300 and receives the gaseous effluent from chamber 300. In certain non-limiting embodiments, the third chamber 400 may be a scrubber. As is known in the art, in certain embodiments the scrubber, if present, may be a wet scrubber or a dry scrubber. The gaseous effluent from second chamber 300 may include un-reacted nitrogen oxides, nitric acid that has not been captured by the second chamber 300, nitric acid produced in regions of the system 113 beyond the second chamber 300, mercury, sulfur oxides, and/or entrained particulates that one wishes to remove from the gas stream exiting the second chamber 300. Such materials may be fully or partially removed using a scrubber in the third chamber 400. For example, nitrogen oxides that are not converted to oxidation products in the first chamber 200 may pass un-reacted through the second chamber 300 and enter the third chamber 400. Such un-reacted nitrogen oxides may be partially or fully removed from the gas stream in third chamber 400. Also, for example, nitric acid that is not recovered in the second chamber 300 may enter the third chamber 400 through conduit 90 and be partially or wholly collected in the third chamber 400.

In certain non-limiting embodiments, the third chamber 400 may include a fourth inlet 110, a terminal outlet 120 for releasing a gas to the environment, and a second outlet 111 for collecting waste from the interior volume of the third chamber 400. In embodiments in which the third chamber 400 is a wet scrubber device, the fourth inlet 110 may communicate with a source of a scrubber solution. The scrubber solution may be, for example, a non-caustic solution, such as water, or a caustic solution, such as a water/sodium hydroxide solution. In certain non-limiting embodiments, the particular scrubber solution may be recirculated through the scrubber to neutralize non-recovered nitric acid passing into the third chamber 400. The first outlet 112 releases any nitrogen oxides ($NO_x$) that are not removed in the second chamber 300 or third chamber 400. The second outlet 111 may be used for extracting wastes from the third chamber 400, and the waste may be reused and/or disposed of, as the case may be.

The system 113 illustrated in FIG. 4 is advantageous in that it allows free nitric acid in the pickling solution 42 in pickling tank 100 to be recovered and, if desired, re-used without the need to control the temperature of the pickling solution 42 to a temperature below a normal pickling operation operating temperature. Also, the system 113 recovers free nitric acid from the pickling solution 42 without the need to filter metallic solids and other particulates from the pickling solution. As discussed above in connection with system 13, a system constructed as generally depicted in FIG. 4 can produce a significant volume of nitric acid in a 24 hour period. An apparatus constructed as generally shown in FIG. 4 could potentially recover as much as 1350 pounds/day of nitric acid (based on 100% acid) from a waste gas stream including 1200 ppm $NO_x$ and flowing at a rate of 4,500 scfm (standard cubic feet per minute). It will be understood that the $NO_x$ gas processed by system 113 may include $NO_x$ generated by the normal pickling process and/or $NO_x$ produced by introducing treating materials into the pickling solution 42. Regardless of the source of $NO_x$ gas, the effect is to recover and/or regenerate nitric acid used in the pickling process.

This disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention. Thus, it is contemplated and understood that the present disclosure embraces additional embodiments not expressly set forth herein. Such embodiments may be obtained, for example, by combining, modifying, or reorganizing any of the disclosed steps, components, elements, features, aspects, characteristics, limitations, and the like, of the embodiments described herein. In this regard, Applicant reserves the right to amend the claims during prosecution to add features as variously described herein.

The invention claimed is:

1. A method for recovering nitric acid from a used or spent acid pickling solution generated by treating one of titanium and a titanium alloy, the method comprising:
   introducing a treating material comprising a reducing agent into the used or spent acid pickling solution comprising free nitric acid, wherein the treating material reacts with at least a portion of the free nitric acid in the used or spent acid pickling solution, thereby producing $NO_x$;
   directly following the preceding step, contacting a gas stream comprising at least a portion of the $NO_x$ with ozone, thereby forming oxidation products including nitrogen sesquioxide and nitrogen pentoxide;
   directly following the preceding step, reacting at least a portion of the nitrogen sesquioxide and nitrogen pentoxide with water, thereby forming nitric acid; and
   collecting at least a portion of the nitric acid;
   wherein the $NO_x$ is not treated with a caustic scrubbing solution in a scrubber between the step of producing the $NO_x$ and the step of collecting at least a portion of the nitric acid.

2. The method of claim 1, wherein the treating material is selected from the group consisting of ferrous sulfate, carbon steel, and iron.

3. The method of claim 1, wherein the used or spent acid pickling solution is disposed in a pickling tank or bath.

4. The method of claim 1 wherein treating one of titanium and a titanium alloy comprises spray pickling an acid pickling solution on one of the titanium and the titanium alloy.

5. The method of claim 1, wherein at least a portion of $NO_x$ produced by the reaction between the treating material and the used or spent acid pickling solution enters gases in a headspace above the used or spent acid pickling solution, and wherein the gas stream includes $NO_x$ from the headspace.

6. The method of claim 1, wherein the used or spent acid pickling solution has a temperature of at least 140° F.

7. The method of claim 1 further comprising mixing the gas stream comprising at least a portion of the $NO_x$ and the ozone by a mixing device.

8. The method of claim 7, wherein mixing the gas stream comprising at least a portion of the $NO_x$ and the ozone comprises mixing in a static mixer.

9. The method of claim 1, wherein collecting at least a portion of the nitric acid comprises collecting solubilized nitric acid in a mist eliminator.

10. The method of claim 9, wherein water vapor is introduced into the mist eliminator.

11. The method of claim 1, further comprising introducing at least a portion of the collected nitric acid back into the used or spent acid pickling solution.

12. The method of claim 1, further comprising recycling the nitric acid into an acid pickling tank, bath, or spray that generated the gas stream comprising $NO_x$.

13. The method of claim 1, wherein a flow rate of the gas stream comprising at least a portion of the $NO_x$ is at least 500 cubic feet/min.

14. The method of claim 1, wherein the reducing agent comprises ferrous sulfate.

15. The method of claim 1, wherein the reducing agent comprises carbon steel.

16. The method of claim 3, wherein the treating material is introduced by a pipe or inlet into the pickling tank or bath.

17. The method of claim 3 comprising flowing the used or spent acid pickling solution from the pickling tank or bath to a secondary tank or compartment, and introducing the treating material by a pipe or inlet into the secondary tank or compartment.

18. A method for recovering nitric acid from a used or spent acid pickling solution generated by treating a metal or a metal alloy, the method comprising:
   introducing a reducing agent into the used or spent acid pickling solution comprising free nitric acid, wherein the reducing agent reacts with at least a portion of the free nitric acid in the used or spent acid pickling solution, thereby producing $NO_x$;
   directly following the preceding step, contacting a gas stream comprising at least a portion of the $NO_x$ with ozone, thereby forming oxidation products including nitrogen sesquioxide and nitrogen pentoxide;
   directly following the preceding step, reacting at least a portion of the nitrogen sesquioxide and nitrogen pentoxide with water to form nitric acid;
   collecting at least a portion of the nitric acid; and
   recycling the nitric acid into an acid pickling tank, bath, or spray that generated the gas stream comprising at least a portion of the $NO_x$;
   wherein the $NO_x$ is not treated with a caustic scrubbing solution in a scrubber between the step of producing the $NO_x$ and the step of recycling the nitric acid.

19. The method of claim 18, wherein the used or spent acid pickling solution is generated by treating one of titanium and a titanium alloy, and the reducing agent is selected from the group consisting of ferrous sulfate, carbon steel, and iron.

20. The method of claim 18, wherein, prior to introducing the reducing agent into the used or spent acid pickling solution, the used or spent acid pickling solution lacks the reducing agent.

21. The method of claim 18, wherein the reducing agent is not generated by treating one of the metal and the metal alloy with the acid pickling solution.

* * * * *